United States Patent [19]

Abe et al.

[11] Patent Number: 5,415,582
[45] Date of Patent: May 16, 1995

[54] COIN FEEDING DEVICE

[75] Inventors: Hiroshi Abe, Tokyo; Yorio Suzukawa, Saitama, both of Japan

[73] Assignee: Asahi Seiko Kabushiki Kaisha, Tokyo, Japan

[21] Appl. No.: 172,932

[22] Filed: Dec. 27, 1993

Related U.S. Application Data

[62] Division of Ser. No. 907,870, Jul. 2, 1992, Pat. No. 5,324,106.

[30] Foreign Application Priority Data

Jul. 3, 1991 [JP] Japan .................................. 3-8096 U
Apr. 14, 1992 [JP] Japan ................................ 4-36053 U

[51] Int. Cl.$^6$ .............................................. G07D 1/00
[52] U.S. Cl. ....................................................... 453/57
[58] Field of Search ........................ 453/32, 33, 34, 35, 453/40, 57

[56] References Cited

U.S. PATENT DOCUMENTS

| | | | |
|---|---|---|---|
| 1,110,263 | 9/1914 | Huntington | 453/57 |
| 4,752,274 | 6/1988 | Abe | 453/32 |
| 5,061,222 | 10/1991 | Suris | 453/57 |

*Primary Examiner*—F. J. Bartuska
*Attorney, Agent, or Firm*—Hopgood, Calimafde, Kalil & Judlowe

[57] ABSTRACT

A drive motor comprises a motor body (5) for rotating a motor shaft (11) in a predetermined forward direction; a brake engagement surface (30) formed at a projection (14) which is projected from a part of the motor shaft; claw piece (15) which engages with the projection at a predetermined position on interruption of electricity for the motor body and acts to stop rotation of the motor shaft, wherein the claw piece comprises an engagement claw (68) of acute angle shape; and a wedge engagement release mechanism (31) for releasing the wedged engagement by rotating the motor shaft in a release direction which is equal to the reversed direction.

4 Claims, 10 Drawing Sheets

COIN FEEDING DEVICE

This application is a division of application Ser. No. 907,870, filed Jul. 2, 1992, now U.S. Pat. No. 5,324,106.

BACKGROUND OF THE INVENTION

This invention relates to a drive motor which can be perfectly stopped just on interruption of electricity and also relates to a coin feeding device which can be rotatable in reverse direction with such a drive motor.

Conventionally, a drive motor of the type described comprises, as illustrated in FIGS. 4 and 5, a motor body 5, a transmission 6, and a motor shaft 11. On being applied to a coin feeding device, the motor body 5 drives the coin feeding device by means of the motor shaft which is rotatable in counterclockwise direction through the transmission 6. Such drive motor is disclosed in, for example, Japanese Patent Examined Publication No. 55-48634.

A coin feeding device comprises a coin hopper 1 where a plurality of coins are received. In the hopper 1, a coin feeding disc 2 is rotatably disposed on a base plate 3. The coin feeding disc 2 is rotated by the motor shaft 11 through the transmission 6, thereby a coin is fed. The number of the fed coins is counted by a counting microswitch. When the number of the fed coins is reached to a predetermined one, the electricity to the drive motor is immediately interrupted. Simultaneously, rotation of the motor shaft 11 is stopped by a brake mechanism 8 described below so that feeding of overabundant coins are prohibited.

Referring to FIG. 5, the brake mechanism 8 comprises a projection assembly and a brake engagement assembly. The projection assembly consists of a brake wheel 13 and a plurality of projections 14. The brake wheel 13 is made of synthetic resin and is attached to the motor shaft 11 so as to be rotated with the motor shaft 11. The projections 14 are integrally formed with the brake wheel 13, being equally apart from each other, on the perimeter thereof.

The brake engagement assembly comprises a claw piece 15 having a claw tip 18, a pivot pin 16, a spring 17, a release iron piece 19, a pivot axis 20, an attracted portion 21, a release piece 23, and a lower end 24 of the release iron piece. The claw tip 18 can be engaged with the projections 14. The pivot pin 16 is for use in pivotally supporting one end of the claw piece 15 to a stator 9 of the motor body 5. The claw piece 15 is always forced towards the projections 14 by the spring 17. The release iron piece 19 extends along an outer surface 22 of the stator 9. The pivot axis 20 is used for pivotally supporting one end of the release iron piece 19 to the stator 9. On the other end of the release iron piece 19, the attracted portion 21 is disposed which is attracted to the stator 9 when the motor body 5 is energized. The release piece 23 downwardly extends from the release iron piece 19 on its side facing to the attracted portion 21. The lower end 24 of the release iron piece contacts with a supporting shoulder 25 at the free end of the claw piece 15.

When a exciting coil 26 of the motor body 5 is energized, the attracted portion 21 is attracted to the outer surface 22 of the stator 9 due to magnetic attraction action of the stator 9. As a result, the release iron piece 19 is rotated in a clockwise direction around the pivot axis 20, thereby the lower end 24 of the release piece 23 pushes the supporting shoulder 25 of the claw piece 15 down against the spring force of the spring 17. The claw tip 18 of the claw piece 15 is out of engagement with one of the projection 14 of the brake wheel 13. Accordingly, the motor shaft 11 is maintained in a rotatable condition.

On the other hand, when the electricity to the exciting coil 26 of the motor body 5 is interrupted, no magnetic attraction action to the attracted portion 21 of the stator 9 is generated. As a consequence, the claw piece 15 is pushed towards the outer surface of the brake wheel 13 by the spring force of the spring 17. Accordingly, the claw tip 18 of the claw piece 15 engages with one of the projections 14 at a predetermined engagement position, thereby the motor 10 is prevented from rotating and the rotation of the motor shaft 11 is stopped. Simultaneously, the coin feeding disc 2 is also stopped from rotation and no coins are fed out.

Description will be made below regarding to a conventional coin feeding device.

A conventional coin feeding device generally comprises, as shown in FIGS. 4, 11, and ]2, a hollow cylindrical case 52 disposed at the lower end of the hopper 1, an outlet 53 provided at the lower end of the upper portion of surrounding surface of the hollow cylindrical case 52, a base plate 3, the coin feeding disc 2 disposed on the base plate 3, coin receiving holes 54, coin feeding arms 55, an outlet guiding member 56, and an outlet guiding pin 57. The hopper 1 defines a reception space for receiving a plurality of coins. The base plate 3 defines the bottom of the hollow cylindrical case 52. The coin feeding disc 2 is rotated by the motor shaft 11 of the drive motor due to its rotation. Each of the coin receiving holes 54 is penetrated through the coin feeding disc 2 and guides a coin A to the base plate 3. The coin feeding arms 55 are disposed between the coin feeding disc 2 and the base plate 3, being radially elongated to a circumference obtained by lacing an approximately center of the coin receiving holes 54. Each of the coin feeding arms 55 rotates accompanying with rotating coin feeding disc 2 and feeds the coin A to the outlet 53 by sliding thereof on the base plate 3. The outlet guiding member 56 is disposed between the coin feeding disc 2 and the base plate 3 at the downstream of the outlet 53 and guides the coin A delivered by the coin feeding arms 55 into the outlet 53. The outlet guiding pin 57 is provided on the base plate 3 and guides the coin A delivered by the coin feeding arms 55 to the outlet 53 in corporation with the outlet guiding member 56.

A scraper 59 has a plurality of coin feeding wings or fingers which is equal in number to the coin receiving holes 54 of the coin feeding disc 2. The scraper 59 rotates on the base plate 3 in synchronism with the coin feeding disc 2. Each of the coin feeding wings or fingers 58 feeds the coin A delivered by the outlet guiding member 56 and the outlet guiding pin 57 towards the outlet 53.

In the above-mentioned conventional brake mechanism, the claw tip of the claw piece is elastically forced to the brake wheel by means of the spring and is engaged with the projection to ensure braking. However, the claw tip is elastically pushed aside by the inertially rotated projections of the brake wheel due to the inertia force on braking. This results in incomplete braking for the coin feeding disc.

It is especially true with the increased inertia force on braking for the purpose of increasing the rotation speed of the drive motor, or with the worn claw and reduced spring force of the spring, because in such conditions the claw and the projections are readily pushed aside. Accordingly, it becomes difficult to completely stop the coin feeding disc at a predetermined engagement position and overabundant coins are thrown out.

On the other hand, in the above-mentioned conventional coin feeding device, the coin feeding disc is rotated in the reverse direction accompanying with the reversed rotation (in clockwise direction) of the motor shaft caused by the reversed rotation of the motor. In this event, the coin delivered from the coin receiving hole to the base plate collides with the outlet guiding member and the outlet guiding pin. Accordingly, the coin is caught between the outlet guiding member with the outlet guiding pin and the coin feeding arms and is fixed therebetween. This causes interruption of reversed rotation of the coin feeding disc, and in turn, that of the motor shaft.

It is therefore a principle object of the present invention to provide a drive motor of which motor shaft can be completely stopped even when the inertia force after braking in increased, or when the claw is worn and the spring force of the spring is reduced after long use, with respect to the above mentioned problem caused to the drive motor.

It is another object of the present invention to provide a coin feeding device which allows reversed rotation of the coin feeding disc and the motor shaft without causing the coin being caught between the outlet guiding member with the outlet guiding pin and the coin feeding arms and fixed therebetween, with respect to the above mentioned problem caused in the coin feeding device.

Other objects and advantages of the present invention will be clear as the description proceeds.

SUMMARY OF THE INVENTION

According to the present invention, a coin feeding device comprising: a hollow cylindrical case disposed at the lower end of a hopper, which defines a reception space for receiving a plurality of coins; an outlet provided the hollow cylindrical case; a base plate which defines the bottom of the hollow cylindrical case; the base plate having an upper surface, a coin feeding disc rotatably disposed on the base plate; coin receiving holes which penetrate through the coin feeding disc and guide the coin to the base plate; coin feeding arms which are disposed between the coin feeding disc and the base plate and are rotated accompanying with rotation of the coin feeding disc to feed the coin to the outlet; an outlet guiding member disposed on the base plate for guiding the coin delivered by the coin feeding arms to the outlet; wherein the outlet guiding member comprises a first riding surface which is inclined from a lower end to an upper end thereof for allowing rotation in a reversed direction when the coin feeding disc is rotated in the reversed direction, the lower end of the first riding surface being located in a relatively lower position with respect to the upper surface of the base plate; wherein the coin delivered from one of the coin feeding holes to the base plate rides on the first riding surface.

BRIEF DESCRIPTION OF DRAWINGS

For a better understanding of the invention as well as other objects and further features thereof, reference is made to the following detailed description to be read in conjunction with the accompanying drawings, wherein.

DETAILED DESCRIPTION OF THE INVENTION

Figure 1:
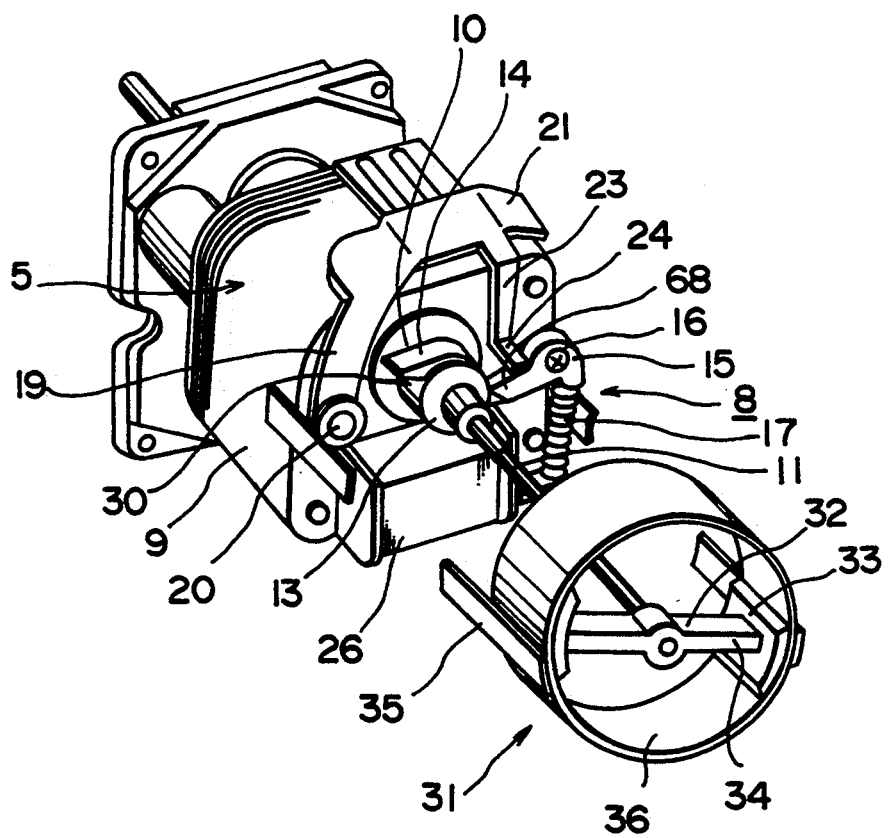
FIG. 1 is a perspective view of a drive motor according to a first embodiment of the present invention.

Next, description will be made as regards some embodiments of the present invention with reference to the drawing.

Figure 2:
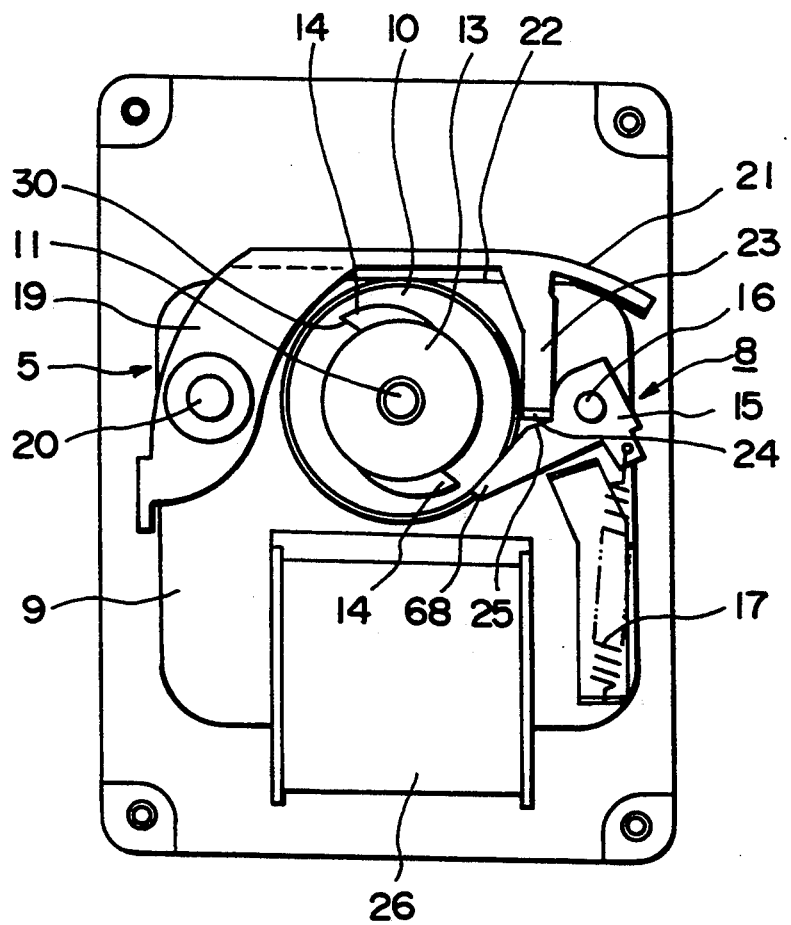
FIG. 2 is a front view of a motor body of a drive motor according to said first embodiment of the present invention, in which an exciting coil is energized.
Figure 3:
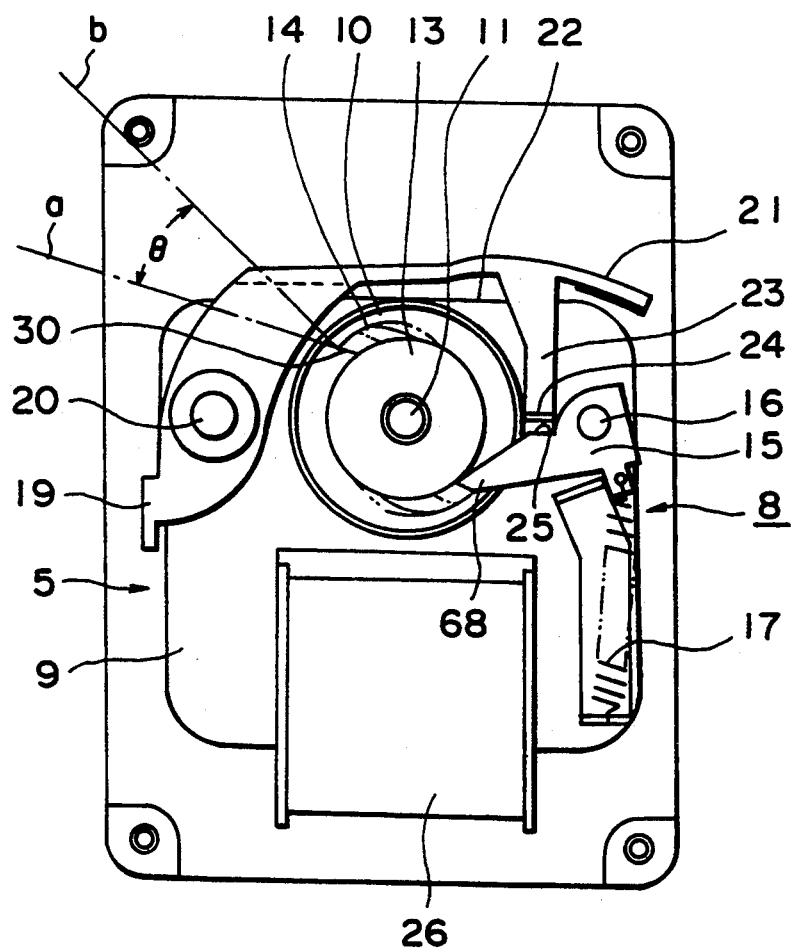
FIG. 3 is a front view of a motor body of a drive motor according to said first embodiment of the present invention, in which an exciting coil is not energized.
Figure 4:
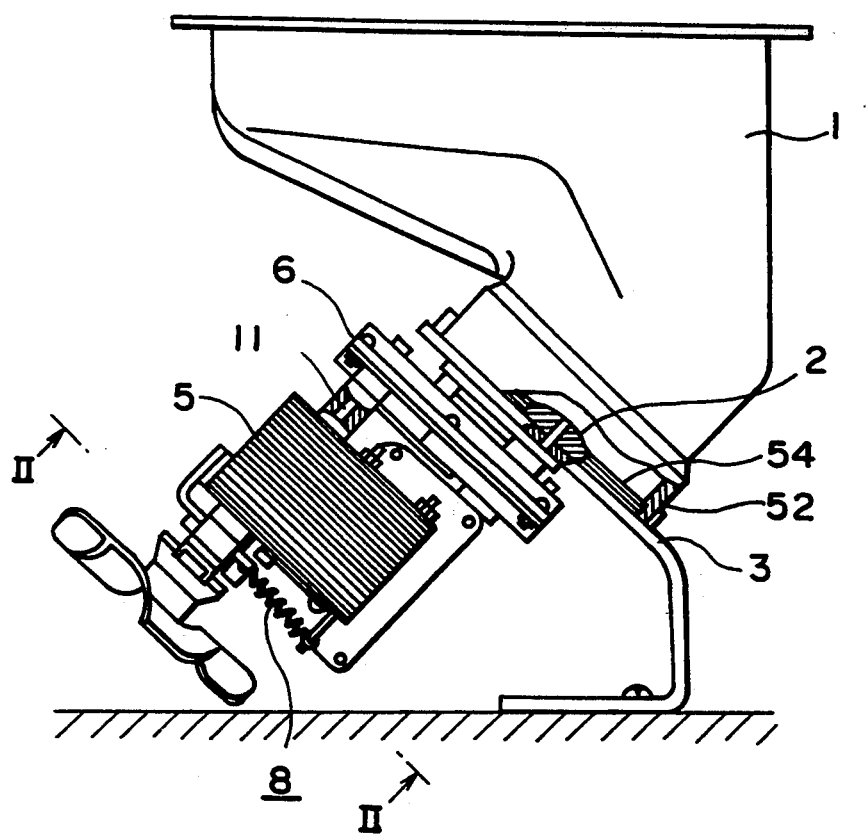
FIG. 4 is a partial side view showing a combination of a drive motor and a coin feeding device.
Figure 5:
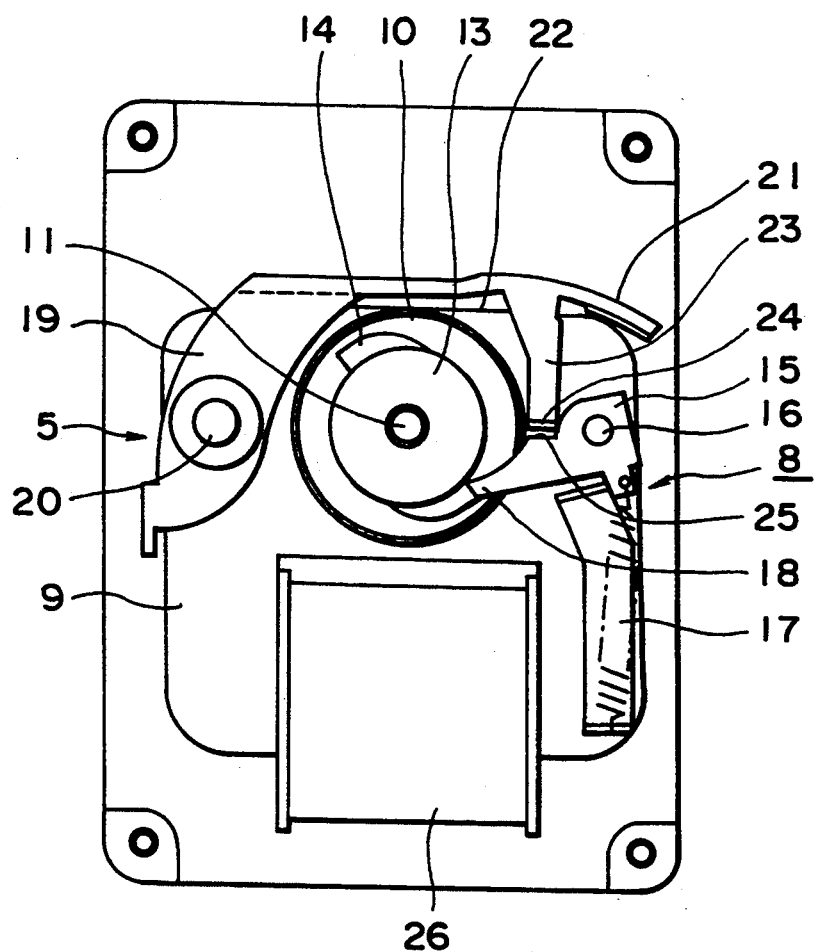
FIG. 5 is a front view of a motor body of a conventional drive motor, in which an exciting coil is not energized.
Figure 6:
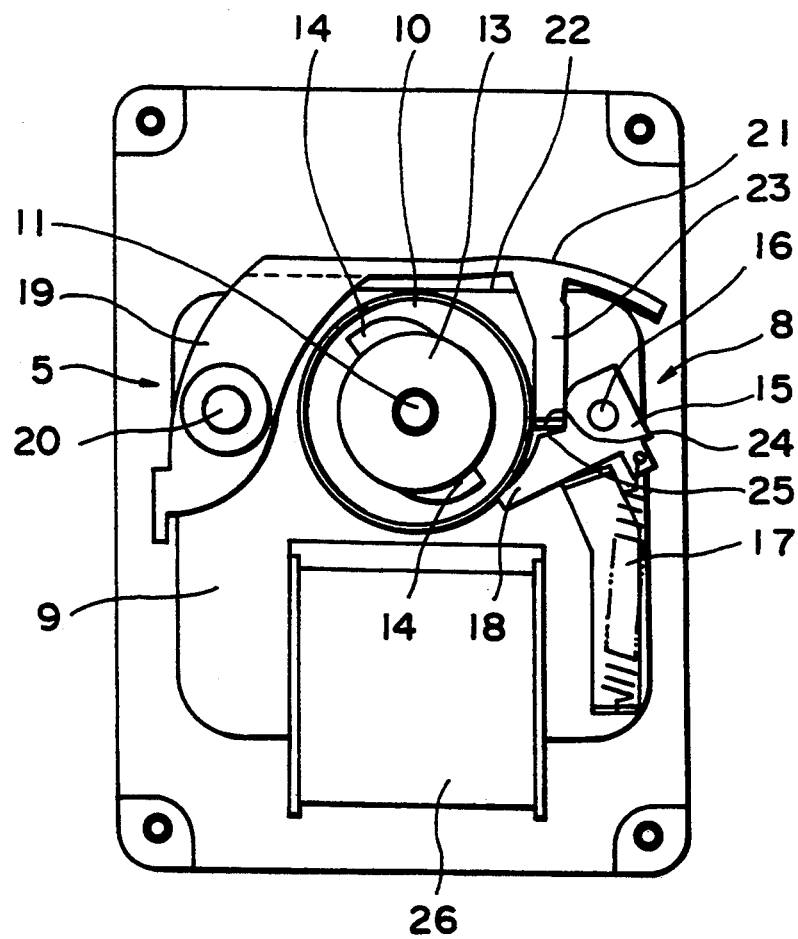
FIG. 6 is a front view of a motor body of a conventional drive motor, in which an exciting coil is energized.

Referring to FIGS. 2 and 3, description will proceed in relation to a drive motor according to a first embodiment of the present invention. The drive motor illustrated in FIGS. 2 and 3 comprises similar parts designated by like reference numerals as in FIGS. 4, 5 and 6. Description of such parts will be omitted for the purpose of brevity of the description.

A brake mechanism 8 in the drive motor consists of a brake engagement assembly and a projection assembly. The brake engagement assembly comprises a claw piece 15 which is made of synthetic resin. A wedge-shaped engagement claw 68 is formed at the top of the claw piece 15. In the projection assembly, a plurality of projections 14 are formed on the outer surface of the brake wheel. Each of the projections 14 has a wedge engagement surface 30. The wedge engagement surface engages in a wedged manner with the wedge-shaped engagement claw 68.

Referring to FIG. 3, an angle 0 between the extending surface "a" which extends along the wedge engagement surface 30 and the surface "b" lying on the top of the wedge-shaped engagement claw 68 along the radius of the motor shaft 11 is preferably in the range of 10 to 45 degrees.

When the electricity for the exciting coil 26 of the motor body 5 is interrupted, the magnetic attraction action to the attracted portion 21 of the stator 9 ceases. As a result, the claw piece 15 is forced against the outer surface of the brake wheel 13 due to the spring force of the spring 17. The wedge-shaped engagement claw 68 of the claw piece 15 engages with the wedge engagement surface 30 at a predetermined engagement position, thereby rotation of the rotor is stopped. Then, rotation of the motor shaft 11 is stopped. Simultaneously, the coin feeding disc 2 also escapes from rotation and no overabundant coin is thrown out.

Wedge engagement allows the wedge-shaped engagement claw 68 to engage with the wedge engagement surface 30 of one of the projections 14. Accordingly, the claw piece 15 is not pushed away even when the motor shaft 11 rotates at relatively high speed and the rotation of the motor shaft 11 is completely stopped.

Figure 7:
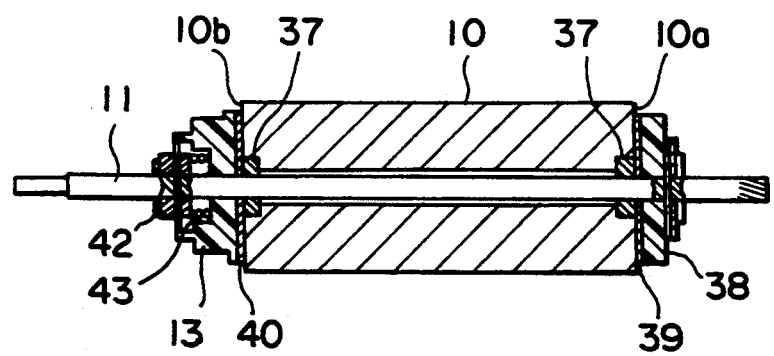
FIG. 7 is a sectional view showing the structure of a rotor and a motor shaft in a drive motor according to a second embodiment of the present invention.

Turning to FIG. 7, description will proceed regarding to a drive motor according to a second embodiment of the present invention.

The drive motor according to the second embodiment utilizes the rotor 10 and the motor shaft 11 as disclosed in Japanese Utility Model Publication No. 63-49802 to the same applicant as the present invention.

The rotor 10 is rotatably attached to the motor shaft 11 of the motor body 5 through a rotor bearing 37. A first frictional plate 39 is inserted between a rotor supporting plate 38 secured to the motor shaft 11 and one end 10a of the rotor 10. Similarly, a second frictional plate 40 is inserted between the brake wheel 13 and the other end 10b of the rotor 10. On the other hand, a brake spring 43 is inserted between a collar 42 secured to the motor shaft 11 and the brake wheel 13. By the spring force of the brake spring 43, the supporting plate 38 and the brake wheel 13 are forced against both ends 10a and 10b of the rotor 10 through the first and second frictional plate 39 and 40, thereby the motor shaft 11 rotates simultaneously with the rotor 10.

Accordingly, when the electricity for the exciting coil 26 of the motor body 5 is interrupted and the wedge-shaped engagement claw 68 of the claw piece 15 engages with the wedge engagement surface 30 at a predetermined engagement position, thereby rotation of the rotor 10 is stopped, a stress which is larger than the spring force of the brake spring 43 is caused when the rotation of the motor shaft is stopped. Therefore, drive linkage between the motor shaft 11 and the rotor 10 is separated. In addition, the rotation by the inertia force caused by the relatively large rotor 10 is not transmitted to the motor shaft 11. Accordingly, more complete breakdown of rotation of the motor shaft 11 can be achieved by means of wedge engagement.

Referring to FIGS. 1, 2, and 3, description will now proceed regarding to the first embodiment according to the present invention.

The drive motor according to the third embodiment of the invention relates to a wedge engagement release mechanism 31. The wedge engagement release mechanism 31 releases, after rotation of the motor shaft 11 is stopped, the wedge engagement between the wedge-shaped engagement claw 68 and the wedge engagement surface 30 as described in conjunction with the first and second embodiments, thereby subsequent rotation operation of the motor shaft 11 is rapidly started.

The wedge engagement release mechanism 31 integrally formed with one end of the motor shaft 11 comprises a release arm 32, iron pieces 34, a ring 36, and a permanent magnet pieces 33. The release arm 32 is made of synthetic resin and is projected in radius direction of the motor shaft 11. The iron pieces 34 is a first ferromagnetic element, attached to the free ends of the release arm 32. The ring 36 is made of synthetic resin and is supported by a supporting arm 35 on the stator 9 of the motor body 5. The ring 36 defines rotation orbit for the iron pieces 34. The permanent magnet pieces 33 is attached to the ring 36.

The permanent magnet pieces 33 are attached to the ring 36 in a position such that the permanent magnet pieces 33 can rotate, in corporation with the iron pieces 34, the release arm 32 in a reverse direction from the engagement position where the wedge-shaped engagement claw 68 and the wedge engagement surface 30 engage with each other.

Either one of the permanent magnet pieces 33 and the iron pieces 34 may be replaced with the other. In addition, the iron pieces 34 may be substituted by a permanent magnet to rotate the release arm 32 in a reverse direction by means of the magnetic attraction action or replusion.

When the electricity for the exciting coil 26 of the motor body 5 is interrupted, the magnetic attraction action to the attracted portion 21 of the stator 9 ceases. As a result, the claw piece 15 is forced against the outer surface of the brake wheel 13 due to the spring force of the spring 17. The wedge-shaped engagement claw 68 of the claw piece 15 engages with the wedge engagement surface 30 at a predetermined engagement position, thereby rotation of the rotor is stopped. Then, rotation of the motor shaft 11 is stopped. Simultaneously, the coin feeding disc 2 also escapes from rotation and no overabundant coin is thrown out.

However, rotation of the motor shaft 11 by the electricity is stopped and the the force of inertia comes into play, causing further rotation of the motor shaft 11, the wedge engagement release mechanism 31 of this embodiment is operated. The iron pieces 34 is attracted by the permanent magnet pieces 33. This results in rotation of the motor shaft 11 in a reversed direction at a predetermined distance. More particularly, the projections 14 are retracted to a position as depicted by the dashed line in FIG. 3. Therefore, the wedge-shaped engagement claw 68 is out of engagement with the wedge engagement surface 30.

As a result, when the motor body 5 is energized after the motor shaft 11 is once stopped, the release iron piece 19 is rotated around the pivot axis 20 in a clockwise direction. The lower end 24 of the release piece 23 pushes the supporting shoulder 25 of the claw piece 15 down against the spring force of the spring 17. The wedge engagement claw 18 of the claw piece 15 is immediately released to outside of the orbit of the engagement surface 30. That is, the wedge engagement claw 18 is released from the projection 14. Therefore, the motor shaft 11 is maintained to being rotated.

Figure 8:
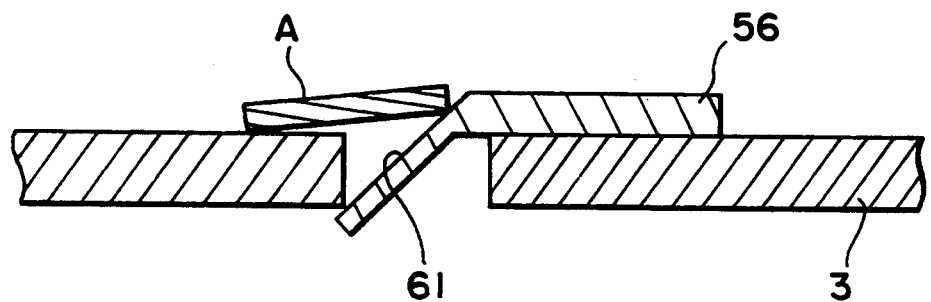
FIG. 8 is a sectional view of an outlet guiding member in a coin feeding device according to a third embodiment of the present invention.
Figure 9:
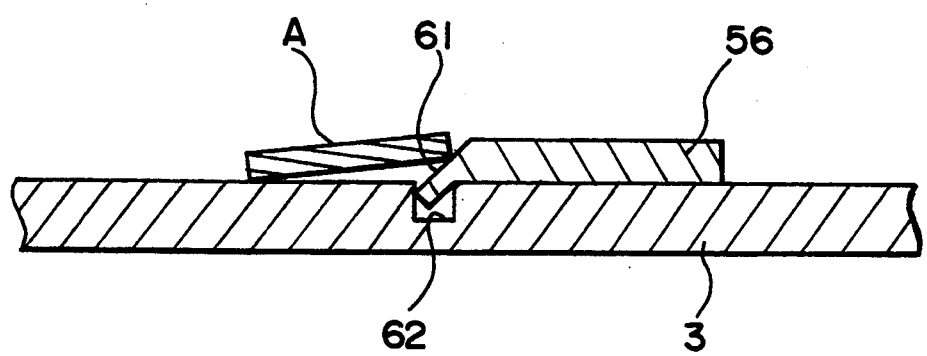
FIG. 9 is a sectional view of another outlet guiding member in a coin feeding device according to a said third embodiment of the present invention.
Figure 10:
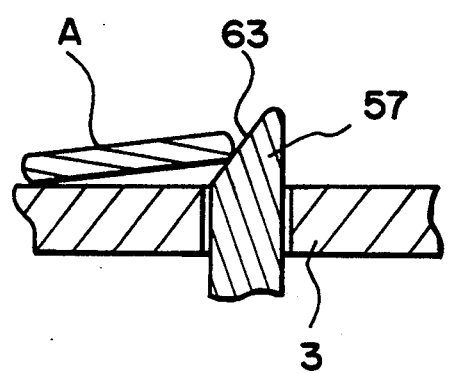
FIG. 10 is a sectional view of an outlet guiding pin in a coin feeding device according to said third embodiment of the present invention.
Figure 11:
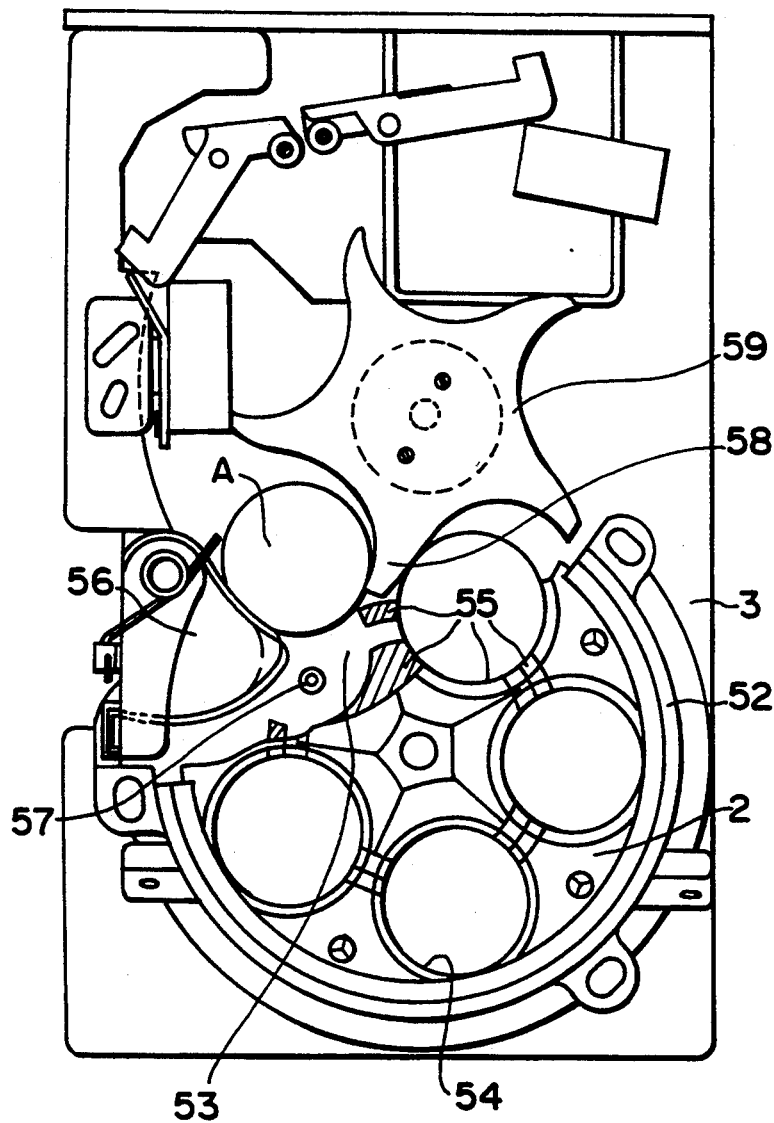
FIG. 11 is a partial front view of a conventional coin feeding device.
Figure 12:
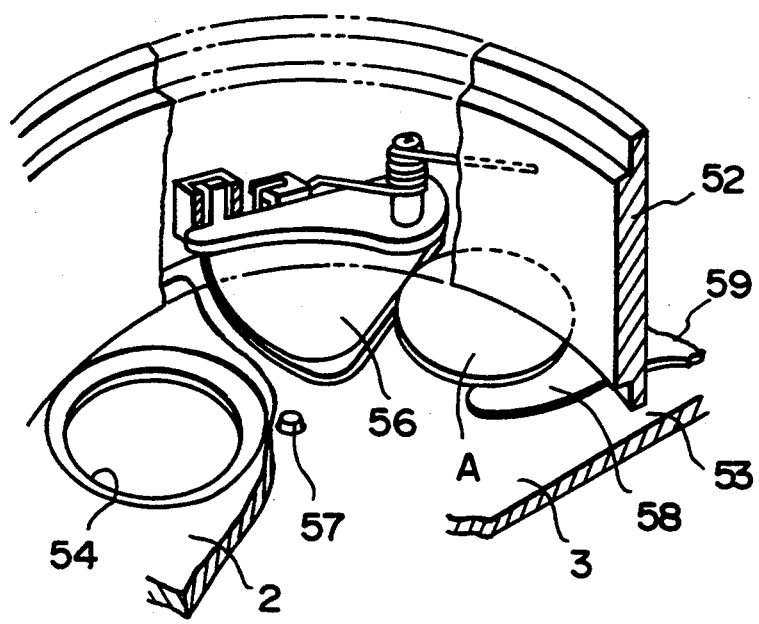
FIG. 12 is a partial perspective view of an outlet guiding member in a conventional coin feeding device.

Referring to FIGS. 8, 9, and 10, description will be made regarding to a coin feeding device according to the third embodiment of the present invention.

The coin feeding device in accordance with the third embodiment of the present invention relates to improvements of the outlet guiding member 56 and the outlet guiding pin 57, which allow smooth rotation of the motor shaft 11 in a reverse direction. This coin feeding device is applied in combination with the wedge engagement release mechanism 31 of the above mentioned third embodiment according to the present invention.

As shown in FIG. 8, when the coin feeding disc 2 rotates in a reverse direction, the outlet guiding member 56 collides with a coin A delivered from the coin feeding hole to the base plate 3. However, the outlet guiding member 56 is provided with a first riding surface 61, which is inclined from the bottom to the top, at a position where it collides with the coin, thereby the coin rides on the riding surface 61.

The coin can be readily ride on the first riding surface 61 because the surface is penetrating through the base plate 3.

As shown in FIG. 9, the base plate may provided with a concave 62 for receiving the lower end of the first riding surface 61, Referring to FIG. 10, when the coin feeding disc 2 rotates in a reverse direction, the outlet guiding pin 57 collides with a coin A delivered from the coin feeding hole to the base plate 3. However, the outlet guiding member 57 is provided with a second riding surface 63, which is inclined from the bottom to the top, at a position where it collides with the coin, thereby the coin A rides on the riding surface 63.

Thus, when the motor shaft 11 of the drive motor rotates in a reverse direction (clockwise direction), the coin feeding disc 2 also rotates in a reverse direction. In this case, the coin A delivered from the coin receiving hole 54 to the base plate 3 collides with the outlet guiding member 56 and the outlet guiding pin 57. However, the first and second riding surfaces 61 and 63 contribute to the riding of the coin so that the rotation of the coin feeding disc 2 in a reverse direction can be allowed and the reversed rotation of the motor shaft 11 becomes possible.

As a result, the motor shaft 11 is rotated in a reverse direction at a predetermined distance by the wedge engagement release mechanism 31, thereby the projections 14 are retracted and the engagement between the wedge-shaped engagement claw 68 and the wedge engagement surface 30 is released.

As described above, according to the present invention, a drive motor can be provided of which motor shaft can be completely stopped even when the inertia force on braking in increased, or when the claw is worn and the spring force of the spring is reduced after long use, with respect to the above mentioned problem caused to the drive motor.

In addition, according to the present invention, a coin feeding device can be provided which allows for the reversed rotation of the coin feeding disc and the motor shaft without causing the coin to be caught between the outlet guiding member with the outlet guiding pin and the coin feeding arms and fixed therebetween, with respect to the above mentioned problem caused by the coin feeding device.

What is claimed is:

1. A coin feeding device comprising:
    a hollow cylindrical case disposed at the lower end of a hopper, which defines a reception space for receiving a plurality of coins;
    an outlet provided said hollow cylindrical case;
    a base plate which defines the bottom of said hollow cylindrical case;
    said base plate having an upper surface;
    a coin feeding disc rotatably disposed on said base plate;
    coin receiving holes which penetrate through said coin feeding disc and guide said coin to said base plate;
    coin feeding arms which are disposed between said coin feeding disc and said base plate and are rotated accompanying with rotation of said coin feeding disc to feed said coin to said outlet;
    an outlet guiding member disposed on said base plate for guiding said coin delivered by said coin feeding arms to said outlet; wherein said outlet guiding member comprises a first riding surface which is inclined from a lower end to an upper end thereof for allowing rotation in a reversed direction when said coin feeding disc is rotated in said reversed direction, the lower end of said first riding surface being located in a relatively lower position with respect to the upper surface of said base plate; wherein said coin delivered from one of said coin feeding holes to said base plate rides on said first riding surface.

2. A coin feeding device as claimed in claim 1, wherein said base plate has a concave surface for receiving the lower end of said first riding surface.

3. A coin feeding device as claimed in any one of claims 1 or 2 further comprising:
    a guide pin disposed on said base plate for guiding said coin delivered by said coin feeding arms from said coin feeding arms to said outlet in cooperation with said outlet guiding member, wherein said guide pin comprises a second riding surface which is inclined from the lower end to the upper end for allowing rotation in said reversed direction when said coin feeding disc is rotated in the reversed direction, wherein said coin delivered from one of said coin feeding holes to said base plate rides on said second riding surface.

4. A coin feeding device as claimed in claim 3, wherein said coin feeding disc and a motor shaft of a drive motor are rotated with each other in an interlocking relationship.

* * * * *